United States Patent Office.

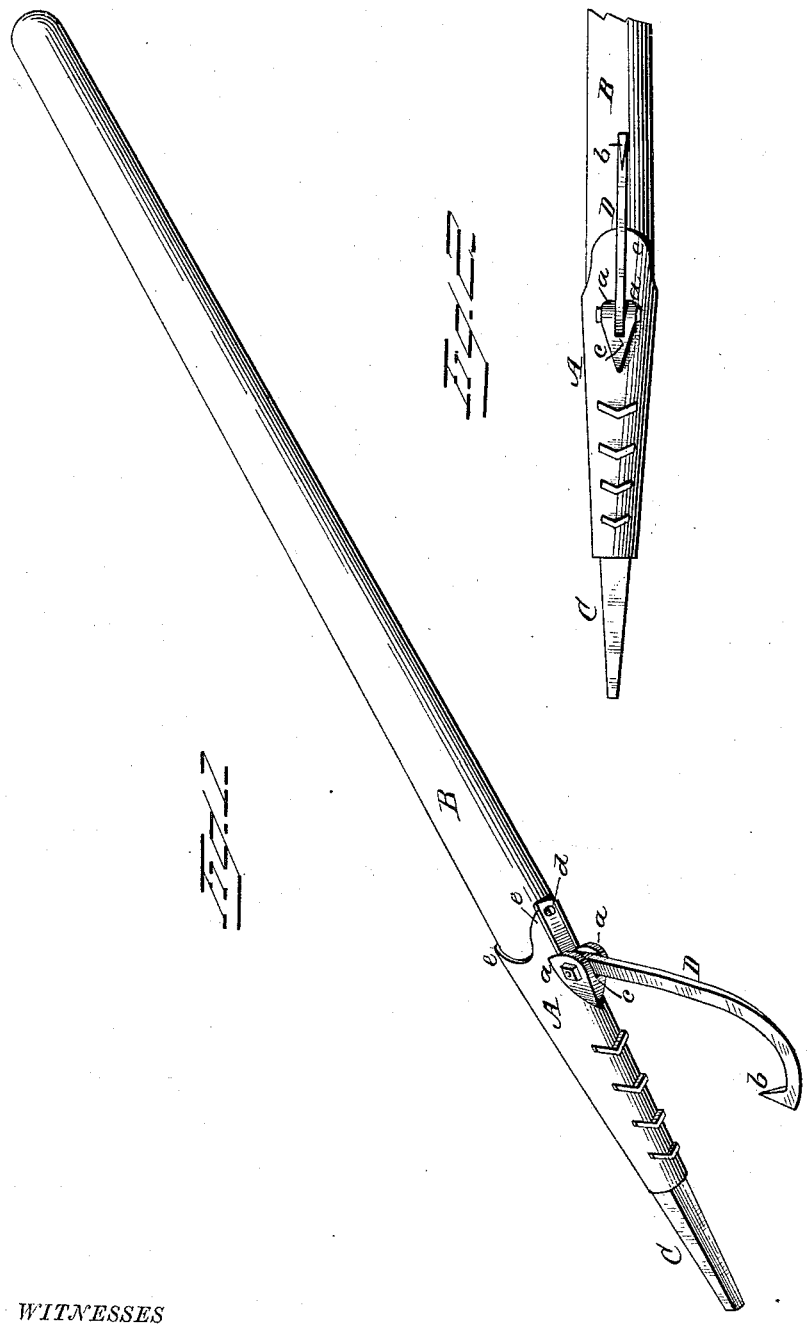

AMOS KENNARD, OF CLEARFIELD, PENNSYLVANIA.

CANT-HOOK OR DOG.

SPECIFICATION forming part of Letters Patent No. 298,759, dated May 20, 1884.

Application filed February 14, 1884. (No model.)

*To all whom it may concern:*

Be it known that I, AMOS KENNARD, a citizen of the United States, residing at Clearfield, in the county of Clearfield and State of Pennsylvania, have invented certain new and useful Improvements in Cant-Hooks or Dogs; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a plan view thereof with the handle partly broken away.

The present invention has relation to that class of cant-hooks or dogs provided upon the under side of the socket to which the handle is connected with a series of teeth adapted to engage the upper portion of the log to more securely hold it between said teeth and the pivoted hook. When logs are first cut from the tree they are peeled—that is, the bark is all taken off—after which the logs are taken by trails to streams and piled in by the thousands from high banks in every conceivable shape, and consequently become wet and very slippery, and it is very difficult, with the ordinary straight teeth or serrated bars formed on the sockets heretofore in use, to remain steady on top of the log when the handle of the tool is lifted up in the act of turning the log.

It is the purpose of my invention to so construct these teeth as will effectually prevent the tool from slipping, especially in a lateral direction. The slipping of such tools when in the hands of the user has been the cause of many accidents and loss of life when working on log-jams in deep rough water.

The invention therefore consists, in contradistinction to forming the teeth straight or on the same horizontal line throughout their length, to construct them on the arc of a circle either V shape or semicircular in form, whereby they will have a greater surface to penetrate the log on an arc of a circle, thus taking a firmer hold without piercing the log too deeply to render it difficult in removing the tool.

The invention further consists in the general construction of the tool, substantially as shown in the drawings and hereinafter described and claimed.

In the accompanying drawings, A represents a tapering socket, to which the handle B is attached, said socket being provided with a pike, C. The socket A is provided with lugs *a*, between which is pivoted one end of a hook, D, having at its opposite end a spur, *b*, to penetrate the side of the log. If desired, these lugs *a* may be cast or forged with the socket A, or made separate and afterward attached in any suitable manner, and they have a shoulder, *c*, which prevents the hook D from falling too far forward and striking the socket. In the rear of the lugs *a* is a stop, *d*, to prevent the hook from falling back on the socket or wooden handle and thereby injuring the user. The socket A at its larger end and upon its upper and under sides is extended, as shown at *e*, to give it additional strength. The socket A upon its under side is provided with a series of ridges, or what I preferably term "teeth," *f*. Heretofore these teeth have generally been straight across the socket, or else spurs were used instead. In either case they have been found inadequate for the purpose—that is to say, they would not serve the purpose of preventing the possibility of the tool slipping when in use. Instead, therefore, of making the teeth straight or extending across the socket in a straight line, I make them on a curve or arc of a circle either semicircular in form or V shape, as shown in the drawings.
This form of the teeth renders them more effective in preventing the slipping of the tool when in the user's hands, and preventing it from lateral or sidewise displacement. By constructing the teeth *f* substantially as shown or described, each tooth has an angular surface which bears on or penetrates the log at different horizontal planes, and consequently takes a firmer hold of the log, with the result hereinbefore stated.

The operation of the tool is no different than those in ordinary use. The lifting or pressing up on the end of the handle forces the hook into the under side of the log, which necessarily brings that part of the socket with the curved teeth down close upon the top of the log, so as to cut or sink deep enough into the log to prevent the tool from slipping in any direction, especially laterally. The peculiar form of the teeth will prevent their being embedded deep enough in the log to prevent the user from instantly releasing his hold with the tool when the log or "jam" starts with the force of water. This is a very essential and important feature in the construction of the teeth, as logs will sometimes form what is termed "jams" in small creeks or streams, said jams being frequently twenty feet high and a half-mile long, the logs being forced down by the water from above until they are piled up in every conceivable shape; and therefore it is of the greatest importance to have a tool that will not slip in any direction, and when the log by a number of men is picked up and dropped in the water it is of the utmost importance, for the protection of life and limb, to have a tool which can be relied on to take hold of a log in any and all positions without slipping, and then in an instant be released from the hold.

Having now fully described my invention, what I claim as new, and desire to secure by Letters Patent, is—

1. A cant-hook or dog having a series of teeth on the arc of a circle V shape in form, or substantially as shown and described, and for the purpose set forth.

2. In a cant-hook or dog, a socket for the handle provided at one end with a pike and at the opposite end with a stop and a series of V-shaped teeth, in combination with a suitable hook pivoted to the socket and provided at its free end with a spur, substantially as and for the purpose described.

In testimony that I claim the above I have hereunto subscribed my name in the presence of two witnesses.

AMOS KENNARD.

Witnesses:
F. W. MOORE,
D. W. MOORE.